United States Patent

Metzger

[15] 3,651,254

[45] Mar. 21, 1972

[54] SCANNING APPARATUS RESPONSIVE TO THE MOVEMENT OF IMAGE BEARING MEDIA

[72] Inventor: Lenard M. Metzger, Rochester, N.Y.

[73] Assignee: Eastman Kodak Company, Rochester, N.Y.

[22] Filed: Aug. 3, 1970

[21] Appl. No.: 60,502

[52] U.S. Cl. ..........178/7.2, 178/DIG. 28

[51] Int. Cl. ..........H04n 5/36

[58] Field of Search..........178/DIG. 28, 7.1, 7.2

[56] References Cited

UNITED STATES PATENTS 2,922,841 1/1960 Graziano..........178/DIG. 28

*Primary Examiner*—Robert L. Richardson

*Attorney*—Robert W. Hampton and R. Lewis Gable

[57] ABSTRACT

The frames of a continuously moving image bearing medium are scanned in a raster pattern to produce an image signal representative thereof, the raster pattern being generated in accordance with the detected rate of movement of the image bearing media. The rate of movement may be detected from the movement of sprocket holes or indicia associated with image bearing frames on the information bearing media or from the synchronized rotation of a disc bearing indicia and synchronized with the movement of the information bearing media. Signals are developed from the detected sprocket holes or indicia that establish the repetitive rate of production of the raster pattern and control the positioning of the raster pattern in synchronism with the movement of the image frames of the information bearing media. The signal representative of the repetitive rate of production of the raster pattern is developed when a single image frame is to be scanned.

18 Claims, 8 Drawing Figures

LENARD M. METZGER
INVENTOR.
BY R. Lewis Gable
Robert W. Hampton
ATTORNEYS

LENARD M. METZGER
INVENTOR.

BY R. Lewis Gable
Robert W. Hampton

ATTORNEYS

LENARD M. METZGER
INVENTOR.

BY R. Lewis Gable
Robert W. Hampton

ATTORNEYS

LENARD M. METZGER
INVENTOR.

BY R. Lewis Gable
Robert W. Hampton

ATTORNEYS

LENARD M. METZGER
INVENTOR.

BY R. Lewis Gable
Robert W. Hampton

ATTORNEYS

SCANNING APPARATUS RESPONSIVE TO THE MOVEMENT OF IMAGE BEARING MEDIA

BACKGROUND OF THE INVENTION

1. Field of the Invention

This invention relates to scanning continuously moving information bearing media to produce an image signal and, more particularly, to scanning continuously moving or stationary motion picture film frames to produce television signals therefrom, the scanning rate being responsive to the rate of movement of a motion picture film.

2. Description of the Prior Art

In telecine transmission systems, flying spot scanning devices have often been used to scan the frames of motion picture film in a scanning raster pattern to produce interlaced television fields representative of the scanned image frames. The scanning raster pattern light beam is modulated by the image pattern of the film frame, and the modulated light is detected and transformed into a video signal by photoresponsive devices. The transmitted video signal controls the electron beam of the television receiver tuned to the transmitting station to reproduce the motion picture film frame on the television screen. Since it is desirable that the motion picture film be moved continuously and transversely to the beam of light produced by the flying spot scanning device at its normally projected frame rate, it is necessary to deflect the scanning light beam in the direction of movement of the film at the field rate frequency. Therefore the frame area of the film scanned remains constant for each scanning field, and each frame is scanned by an integral number of scanning fields.

Prior art systems have used optical image splitting apparatus or mechanical light directing apparatus to deflect the scanning beams at the same point on the film frame during each scanning field. These systems are relatively cumbersome and subject to mechanical failure.

Further prior art systems contemplate the use of apparatus for applying a signal having an irregular amplitude, sawtooth wave form to the vertical deflecting coils of the flying spot scanning device to deflect the scanning light beam in the direction of film movement. Such systems may be, relatively expensive, and in many instances, are not directly synchronized to the actual rate of movement of the film frames.

SUMMARY OF THE INVENTION

Accordingly, it is an object of the present invention to produce television field signals by scanning the frames of motion picture film moving continuously at a predetermined frame rate.

Another object of the invention is to produce a vertical deflection signal for a flying spot scanning device in response to the rate of movement of the film being scanned.

It is also an object of the present invention to controllably deflect a scanning beam to the frames of the stationary or continuously moving motion picture film in response to the rate of movement of the film.

A preferred embodiment of the present invention includes means for scanning, in a raster pattern, the frames of motion picture film in a scanning station to produce an image signal therefrom. Means are provided to move the motion picture film through the scanning station at the nominal rate at which the images are recorded on the frames of the film. Sensing means responsive to the actual rate of movement of the film, detect and generate a train of pulses in accordance with the raster deflection rate and also detect and generate a further train of pulses representative of the television field rate. The pulse trains are combined to produce a complex vertical deflection wave form signal that controls deflection of the scanning means in the direction of movement of the film. More particularly, pulse trains are combined in an integrating circuit to produce the complete vertical deflection sawtooth wave form signal.

In one preferred embodiment of the invention, the respective pulse trains are generated by photoresponsive devices sensitive to light modulated by indicia on a disc mounted for rotation with the sprocket wheel of the film drive. In another preferred embodiment of the invention, the respective pulse trains are detected by a series of photoresponsive devices sensitive to light modulated by the sprocket holes in the motion picture film.

Means are also provided to produce a vertical deflection wave form signal sufficient to register the raster pattern on a stationary film frame.

Other objects and advantages of the invention will become apparent from the following description taken in conjunction with the accompanying drawings.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
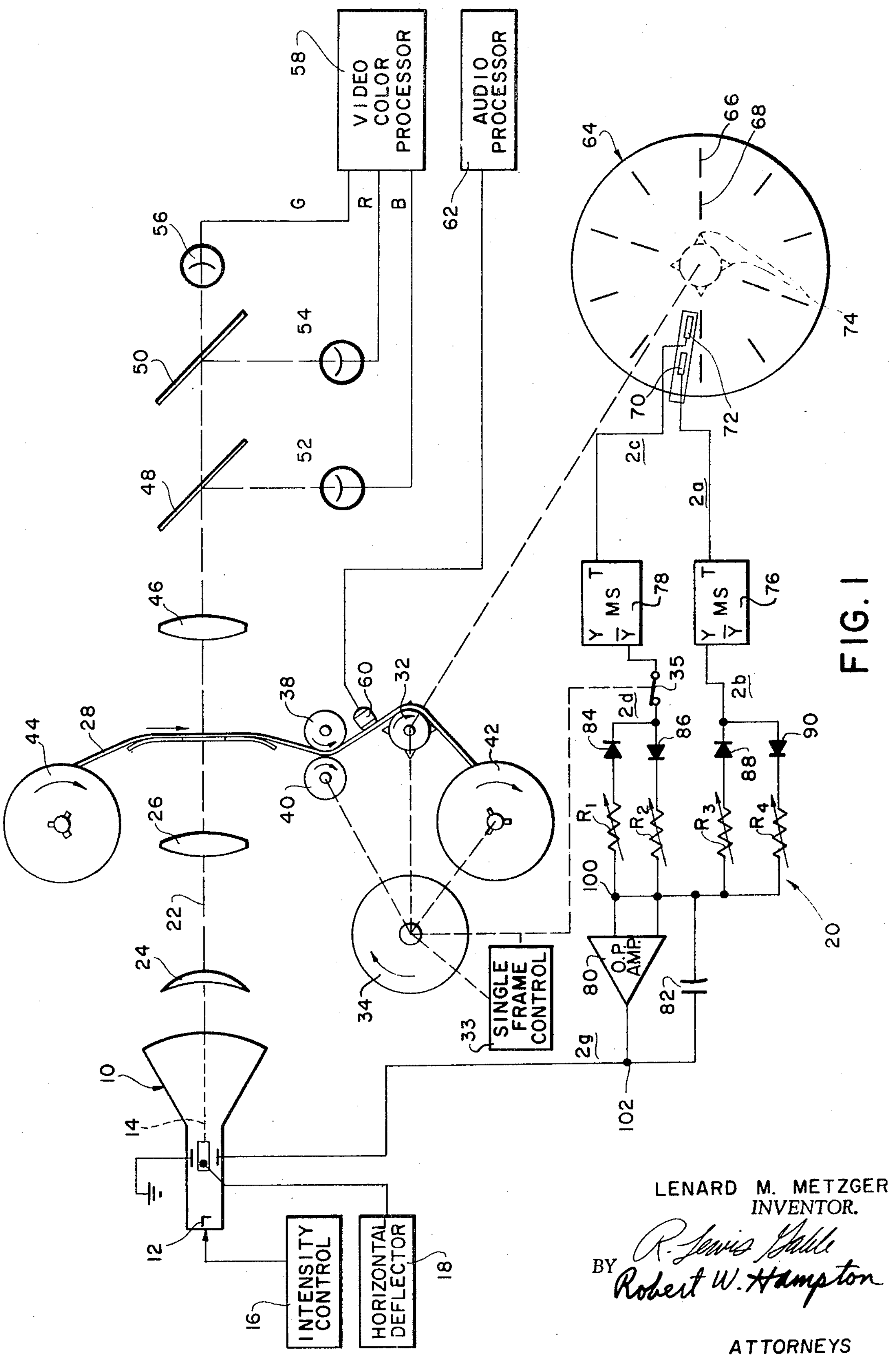
FIG. 1 is a schematic illustration of one embodiment of a film scanning system in accordance with the invention.

Referring now to the drawings and first to FIG. 1, as one preferred embodiment of the invention, there is shown a flying spot scanning system for converting images on a motion picture film into video signals suitable for television transmission or direct application to a television receiver. The motion picture film is scanned at the 60 field per second video scanning rate that is commonly employed in the United States, while the film is moving at the frame rate at which it was exposed and would normally be projected. In order to scan each film frame by an integral number of television fields in an interlaced pattern of line scans, it is necessary to synchronize the vertical deflection of the scanning beam of the flying spot scanning device with the film frame rate. In the embodiment shown in FIG. 1, this synchronization is accomplished with the timing disc and vertical deflection circuit described hereafter.

The scanning system includes a cathode ray tube 10 having a cathode 12 that emits an electron beam 14, the concentration of which is controlled by an intensity control circuit 16. A horizontal deflection yoke operates in the well known manner under the influence of a horizontal deflection circuit 18 to direct the beam 14 horizontally across the screen of a cathode ray tube 10 at a scanning frequency of 15,750 Hz. A vertical deflection yoke operates to deflect the electron beam 14 vertically in response to a complex vertical deflection wave form signal generated by vertical deflection circuit 20.

The screen of the cathode ray tube 10 preferably is composed of a wide band spectral emission fluorescent material such as zinc oxide ($P_{24}$) phosphor which, when excited by the electron beam 14, will produce a light spot on the screen. Under the control of the horizontal and vertical deflection signals, the electron beam 14 is swept across the screen in a raster pattern of discrete spaced apart line scans to generate a scanning light beam 22.

The light beam 22 is condensed by a lens 24 and thereafter focused by lens 26 onto an image bearing medium 28 located with respect to a scanning station 30. Scanning station 30 may consist of, in the preferred embodiment of the invention, an opaque film gate having an aperture therein. The aperture of the film gate has a dimension in the direction of elongation of the film 28 which is related to the rate of movement of the film and the height of the film frames. In order to accommodate the maximum vertical deflection of the scanning light beam that can be expected, the dimension is equal to twice the dimension of a film frame.

The image bearing media may take the form, for example, of Super 8 color motion picture film which has been exposed in a motion picture camera and processed using known techniques. As is well known in the art, such film is manufactured with sprocket holes along one side to enable the film to be advanced a predetermined rate in the camera and exposed to record images thereon in spaced discrete frames. The standard film exposure frame rate of the prior art is nominally 18 or 24 frames per second.

The motion picture film 28 is advanced through the scanning area 30 in a downward direction by sprocket wheel 32 that is mechanically coupled in a manner well known in the art as indicated by a dotted line in FIG. 1, to an electric motor 34 and driven in the clockwise direction. Preferably the electric motor 34 is synchronized to the 60 Hz. alternating current source and rotates in the clockwise direction at a constant rate that may be adjusted to accommodate the film being scanned. The motion picture film 28 is also engaged by a capstan 38 and a tensioning wheel 40 which cooperate to keep the film taut within the scanning station. The electric motor 34 is also coupled as indicated by dotted lines to rotate takeup reel 42 in the clockwise direction to wind the film 28 from the supply reel 44 onto the takeup reel 42.

The scanning light beam 22 passes through the frame within the scanning station 30 in the raster pattern described and is modulated by the color image thereon. The modulated light beam is focused by a lens 46 and is intercepted by dichroic mirrors 48 and 50 which are effective to separate and pass the blue, red, and green color components of the modulated light to respective photoresponsive devices 52, 54 and 56. The dichroic mirror 48 is effective to reflect the blue color component to the surface of the photoresponsive device 52 and pass the green and red color components to the surface of dichroic mirror 50. Dichroic mirror 50 is effective to transmit the green color component to photoreponsive device 56 and reflect the red color component to photoresponsive device 54. The photoresponsive devices 52, 54 and 56 translate the intensity of their respective color components into electrical signals which are applied to the video color signal processor 58 of the television transmitter or receiver.

The film 28 may also have a sound track which may be detected by an audio reproduction transducer 60 and translated into an audio signal for the audio signal processor 62 of the television transmitter or receiver.

The system hereinbefore described with respect to FIG. 1 is known in the prior art of telecine reproduction. In the past, practioners of the art have either employed optical image deflecting apparatus interposed between the flying spot scanner and the scanning station, or inflexible vertical deflection apparatus for producing a vertical deflection signal which compensates for movement of the film frames. These prior art approaches have required the employment of highly accurate film moving mechanisms to insure that the scanning raster is properly registered with each moving film frame. In neither approach, have the prior art practioners provided a vertical deflection apparatus wherein the television field rate and the raster deflection rate are detected from the movement of the motion picture film and synchronized thereby. In accordance with the present invention, vertical deflection circuitry is provided that combines detected pulse trains representative of the television field rate and the raster deflection rate to produce a vertical deflection signal having a complex sawtooth wave form.

The detection apparatus of FIG. 1 consists of a disc 64 mounted to rotate with the sprocket wheel 32 (displaced for convenience of illustration) and having thereon, in two concentric tracks 66 and 68, indicia spaced apart at the frequency of the television field rate and the raster deflection rate, respectively. Photoresponsive devices 70 and 72 are disposed to detect and translate light transmitted from a suitable light source and mask (not shown) through transparent indicia, or reflected by opaque indicia, into respective television field rate frequency and raster deflection rate pulse trains, respectively.

As stated hereinbefore, the television field rate frequency is the rate at which the scanning raster pattern is repeated and is 60 per second in the United States.

In order to translate the information appearing in each motion picture film frame into signals suitable for television reproduction of the image frame, it is necessary, as stated hereinbefore, to scan each film frame by an integral number of television fields in an interlaced pattern of line scans. To accomplish this objective in accordance with the preferred embodiments of the present invention, apparatus is provided to determine, in accordance with the rate of movement of the film, the proper number of television fields to scan each image frame. Referring to FIG. 2*a there are shown the relative periods of* 24 frames per second, motion picture film and the 60 field per second, television scanning rate. The common denominator of the 1/60 second period and the 1/24 second period is 1/12 second and, as illustrated, five field scans occur in a time of two film frames ($5 \times 1/60 = 2 \times 1/24 = 1/12$). An examination of the disc 64 reveals that in the interval including two successive sprocket teeth indicated at 74, there appear two raster deflection and five field rate pulses.

The raster deflection that will properly scan the moving film consists of alternate frames of the film being scanned twice in 1/30 second and three times in 1/20 second for a total of five field scans in two film frames. The detected raster deflection rate pulses shown in FIG. 2*c* are therefore spaced apart at alternate 1/20 and 1/30 second periods and are in phase with the field rate pulses.

The vertical deflection circuitry 20 includes two monostable multivibrators 76 and 78 to which are applied, at their respective input terminals, the detected field rate pulse train of FIG. 2*a*, as derived from the photoresponsive device 70, and the detected raster deflection rate pulse train in FIG. 2*c*, as derived from the photoresponsive device 72. An integrator circuit including operational amplifier 80 and condenser 82 is connected at the output terminals of the monostable multivibrator circuits and is effective to produce a vertical deflection signal having the complex sawtooth wave form necessary to register the scanning raster pattern upon the moving motion picture film frames.

The representative block diagrams of the multivibrator circuits 76 and 78 have trigger T inputs and Y and $\overline{Y}$ outputs in accordance with symbology employed by Millman and Taub in the textbook, *Pulse, Digital and Switching Wave Forms* published by McGraw-Hill Book Co., and in which suitable practical circuits may be found to employ in the practice of the present invention. The symbols Y and $\overline{Y}$ simply means that an output signal on Y is the complement of an output signal on $\overline{Y}$.

The monostable multivibrator circuit 76 and 78 are responsive to the positive going transitions of the detected pulse trains to produce the pulse trains of FIGS. 2*b* and 2*d*, each pulse having a constant duration *t*1 equal to the retrace time between field scans of the cathode ray beam 14. The signals depicted by the wave forms of FIGS. 2*b* and 2*d* are transmitted by diodes 84, 86, 88 and 90 and variable resistors R1, R2, R3 and R4 to the summing input terminal 100 of operational amplifier 80. capacitor 82, connected between the summing input terminal 100 and the output terminal 102 of the operational amplifier, is effective, in cooperation with the operational amplifier, to operate as a Miller integrator to integrate the summed pulse trains.

The integrator circuit operates in the well known manner, as described, for example, at pages 458 and 462 in the book entitled *Reference Data for Radio Engineers, Fourth Edition*, published by International Telephone and Telegraph Co., to integrate a square wave input signal into a triangular wave output signal by means of a series RC circuit.

The sawtooth wave forms of FIGS. 2*e*, 2*f* and 2*g* represent respectively, the response of the integrator circuit to the field rate pulse wave form of FIG. 2*b*, the raster deflection rate pulse wave form of FIG. 2*d*, and the combination of the wave forms of FIGS. 2*b* and 2*d*. The wave form of FIG. 2*g* represents the mathematical summation of the wave forms of FIGS. 2*e* and 2*f* and constitutes the requisite wave form of the vertical deflection signal necessary to scan continuously moving film at 24 frames per second.

The wave form of FIG. 2*e* must have a maximum amplitude equal to the voltage necessary to deflect vertically the scanning raster pattern of the flying spot scanning device 10 upon a stationary film frame. The slope of the wave form of FIG. 2*e* is governed by the relative values of resistors R4 and R3 and capacitor 82. The time constant of resistor R4 and capacitor 82 is adjusted to be equal to the retrace time $t1$. The occurrence of each pulse of the wave form of FIG. 2*b* charges the capacitor 82 to the maximum amplitude potential through diode 90 and resistor R4. The positive potential at the input terminal 100 is inverted by operational amplifier 80, and the output signal at the output terminal 102 decreases during the interval of time $t1$ to a reference potential depicted as O in FIG. 2*e*. Thereafter, in the interval $t2$ the capacitor 82 is discharged to the reference potential O of FIG. 2*b* through resistor R3 and diode 88. The operational amplifier 80 inverts the discharge signal of the capacitor 82 and the output signal at the output terminal 102 increases in voltage at a linear rate as shown in FIG. 2*e*. The linear rate and the maximum amplitude of the wave form of FIG. 2*e* is determined by adjusting the resistance R3 to be equal to the product of R4 $\times$ $t2/t1$. Therefore, in the absence of any raster deflection pulse signal, the integrator circuit would operate to produce a signal having the wave form of FIG. 2*e*.

In like manner, the time constant of resistor R1 and capacitor 82 is adjusted by varying the resistance of resistor R1 to be equal to the retrace time $t1$. However, the resistor R2 must be adjusted to be equal to the product of R1 +60 (field rate frequency-K)/(frame rate of movement-M). In the same manner as described above, the resistors R2 and R1, the diodes 84 and 86, and the capacitor 82 cooperate to produce from the raster deflection signal having the wave form of FIG. 2*d* an output signal at terminal 102 having the wave form of FIG. 2*f*. At each occurrence of the raster deflection signal, the wave form of FIG. 2*f* undergoes a transition having a maximum value equal to the maximum amplitude of the wave form of FIG. 2*e*.

The resulting complex sawtooth wave form of FIG. 2*g* represents the mathematical summation by the integrator of the wave forms of FIGS. 2*e* and 2*f*. The slope of the resultant wave form of FIG. 2*g* automatically adjusted to compress the scanning raster pattern of each television field by an amount equal to 24/60's of the vertical dimension of a film frame. The movement of the film in the downward direction cooperates with the compressed scanning raster pattern to expand the pattern to scan the entire image frame during each television field.

In the event that a stationary film frame is selected for viewing by the operator, a single frame control 33, which may take the form of a mechanical clutch, is interposed between the motor 34, the sprocket wheel 32, the capstan 40, and the takeup reel 42, to withdraw the sprocket wheel and halt the movement of the film. Furthermore, a switch 35 is provided in the output conductor of multivibrator 78 that is operated in conjunction with the control 33 to open the conductive path between the $\overline{Y}$ terminal of multivibrator 78 and the diodes 84 and 86. The resultant vertical deflection signal would have the wave form of FIG. 2*e*.

In like manner a disc 64 may be prepared for any integral frame scanning rate, and the resistors R1 – R4 may be adjusted in the manner described to produce a vertical deflection signal having the requisite complex sawtooth wave form to scan the motion picture film moving at that frame rate. The number N of equally spaced indicia on the field rate frequency track of the scanning disc is governed by the constant 60 field per second frequency K, the variable frame rate of movement M, and the number of sprocket teeth P, in the following relationship:

$$K/M = N/P; \text{ and } N = P \times K/M.$$

The number of indicia on the raster deflection track is always equal to the number of sprocket teeth since one film frame corresponds to each sprocket hole in the film. The spacing of the raster deflection indicia is governed by the requirement that the scanning raster of the flying spot scanning device 10 must be deflected in a repetitive pattern at the field rate frequency to scan each film frame an integral number of times. Therefore, the raster deflection indicia are in phase with the field rate indicia and spaced apart by integral multiples of the field rate indicia. For all the film frame rates between 20 and 30 frames per second, the raster deflection indicia are spaced apart by either two or three field rate indicia. For all the frame rates between 10 and 20 frames per second, the raster deflection indicia are spaced apart by either three or four field rate indicia, and at the 20 frame per second rate, the raster deflection indicia are in phase with, and spaced apart by, three field rate indicia.

Figure 3:
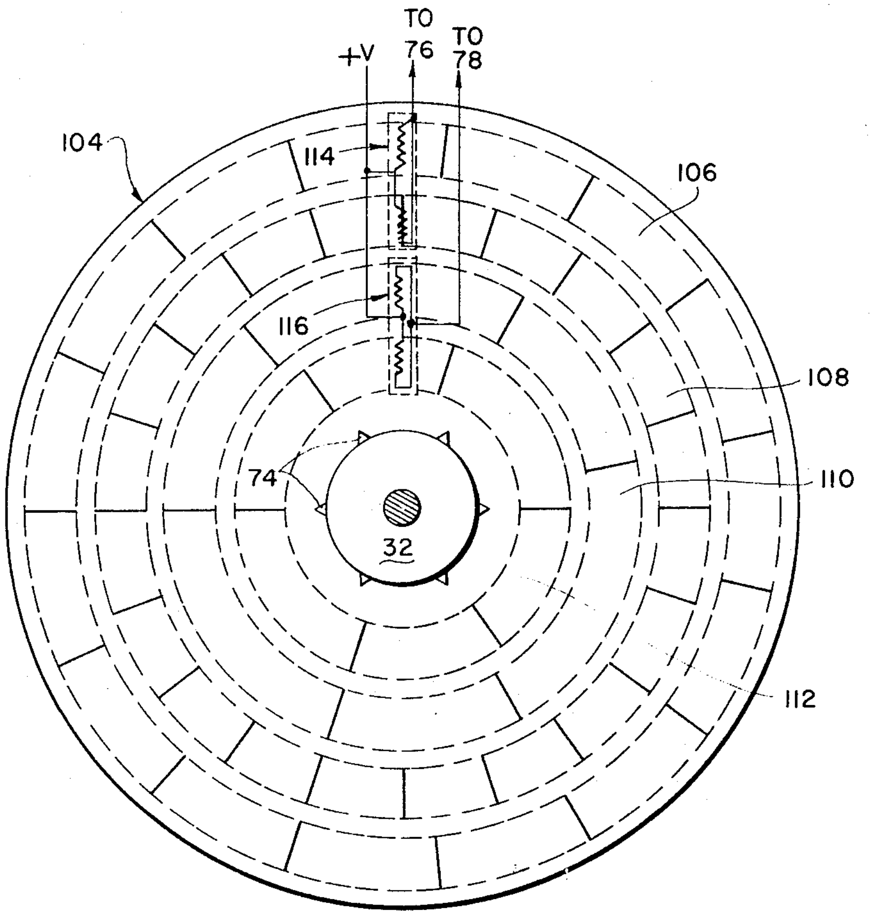
FIG. 3 is a schematic illustration of an alternative disc for use in FIG. 1.

Referring now to FIG. 3 there is shown an alternate disc 104 suitable for use with both 24 frame per motion picture film and 18 frame per second motion picture film. As shown, the sprocket wheel has six sprocket teeth thereon. Therefore, the number of indicia in track 106 at 24 frames per second is equal to: $(60 \times 6)/24 = 15$. The number of raster deflection indicia in row 110 at 24 frames per second is equal to 6, and they are spaced apart by two and three successive field rate indicia.

The number of field rate indicia in row 108 for 18 frames per second is equal to: $(60 \times 6)/18 = 20$. The number of raster deflection indicia in row 112, at 18 frames per second, is equal to 6, and they are spaced apart in a pattern of three, three and four field rate indicia. Therefore, three successive image frames are scanned by three, three and four television fields, respectively.

Two pairs of photosensors, 114 and 116, are arranged to detect light emitted by a source (not shown) that passes through or is reflected by the field rate indicia of tracks 106 and 108 and the raster deflection indicia of tracks 110 and 112, respectively. The pair of photosensors 114 is electrically connected in parallel to a voltage source + V and the input terminal T of multivibrator 76. In like manner, the pair of photosensors 116 is electrically connected in parallel to the voltage source + V and the input terminal T of multivibrator 78.

Figure 4:
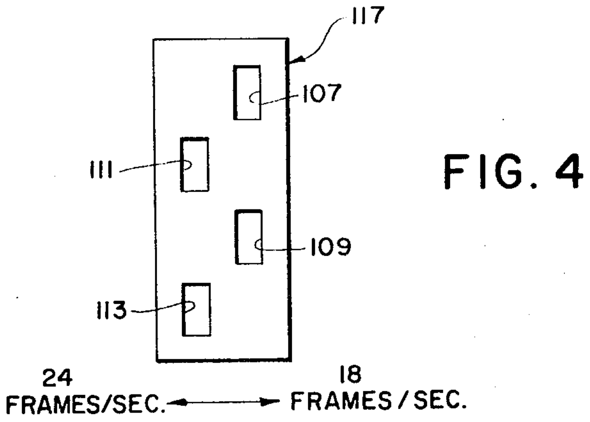
FIG. 4 is a schematic illustration of a sensor mask for use in conjunction with the disc of FIG. 3.

The mask 117 of FIG. 4 is provided in order to allow, in accordance with the rate of film movement, the modulated light to strike one photosensor of each pair of photosensors 114, 116. Although not illustrated, the light mask is intended to be supported between, and in close proximity to, the photosensor pairs 114 and 116 and the disc 104. The mask 104 is intended to be movable, in the direction of the arrows, to mark one or the other photosensor of each pair in accordance with the proper rate of movement of the film.

Obviously, any number of tracks of raster deflection and field rate indicia, with associated marks and photocells, could be provided on such a disc.

Figure 6:
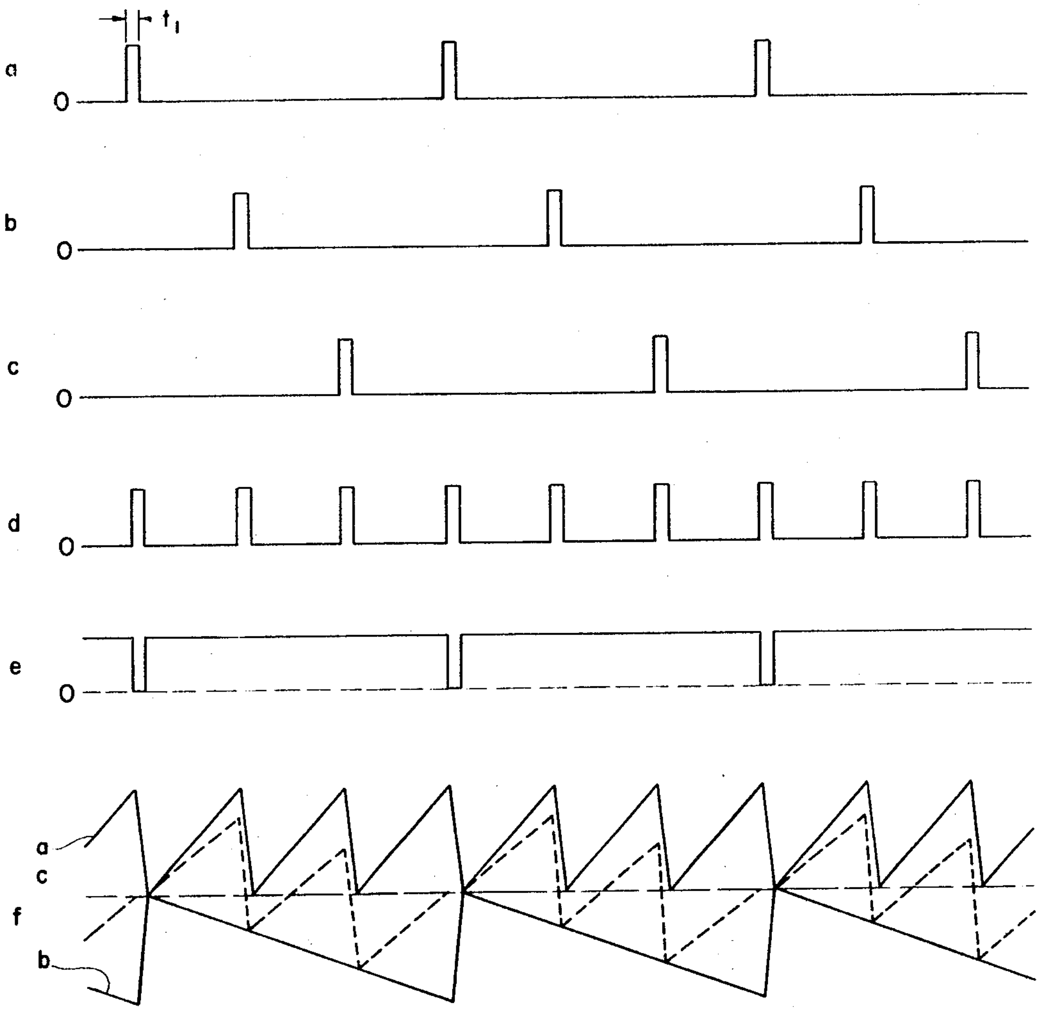
FIG. 6 is a view showing wave forms for scanning a continuously moving film in accordance with the embodiment of FIG. 5.
Figure 5:
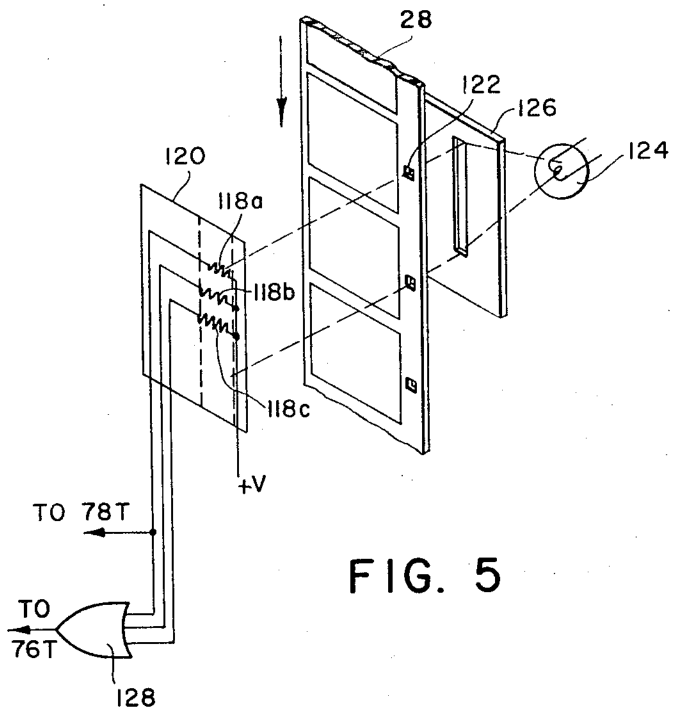
FIG. 5 is a schematic illustration in partial perspective of another embodiment of a film scanning system in accordance with the invention.

In FIGS. 5 and 6, there is shown an alternative apparatus for generating the raster deflection television field rate pulse signals from the movement of the sprocket holes of the motion picture film. At 20 frames per second, or any other rate of movement that is an integral submultiple of the 60 per second television field rate, a plurality of photosensors equal in number to the aforementioned integer are arranged equally spaced apart in the dimension between the leading edges of two sprocket holes. As depicted in FIG. 5, at 20 frames per second, three photosensors 118*a*, 118*b* and 118*c* are arranged on a suitable substrate 120 equally spaced apart in the distance between two successive sprocket holes 122. Light source 124 and mask 126 cooperate with each sprocket hole 122 as it advances in the direction of movement of the film, indicated by the arrow, to direct light successively upon the photosensors 118*a*, 118*b* and 118*c*. The detection of the light by the photosensors produces the pulse signals depicted by the wave forms of FIGS. 6*a*, 6*b* and 6*c*.

The pulse signals of wave forms 6*a*, 6*b* and 6*c* are added by OR gate 128 and applied to the input terminal T of the monostable multivibrator 76 of FIG. 1. The output signal of multivibrator 76 is shown by wave form 6*d* and has a frequency equal to the 60 per second television field rate.

The pulse signal of wave form 6*a* is also applied to the input terminal T of the multivibrator 78 of FIG. 1. The output signal of multivibrator 78 is shown by wave form 6*e* and has a frequency equal to both the 20 frames per second rate of movement and the raster deflection rate.

In accordance with the practice set forth hereinbefore, resistors R1 and R4 are adjusted to reflect the period $t1$; resistor R3 is adjusted to reflect the period $t2$; and resistor R2 is adjusted to reflect the period equal to:

$$(K)/(M)\ 60/20 \times t2 \text{ or } 3t2.$$

The resulting sawtooth wave forms A, B and C are depicted in superimposition in FIG. 6*f*. The raster deflection signal having the wave form C is the sum of the detected raster deflection sawtooth wave form signal B and the detected television field rate sawtooth wave form signal A.

Figure 2:
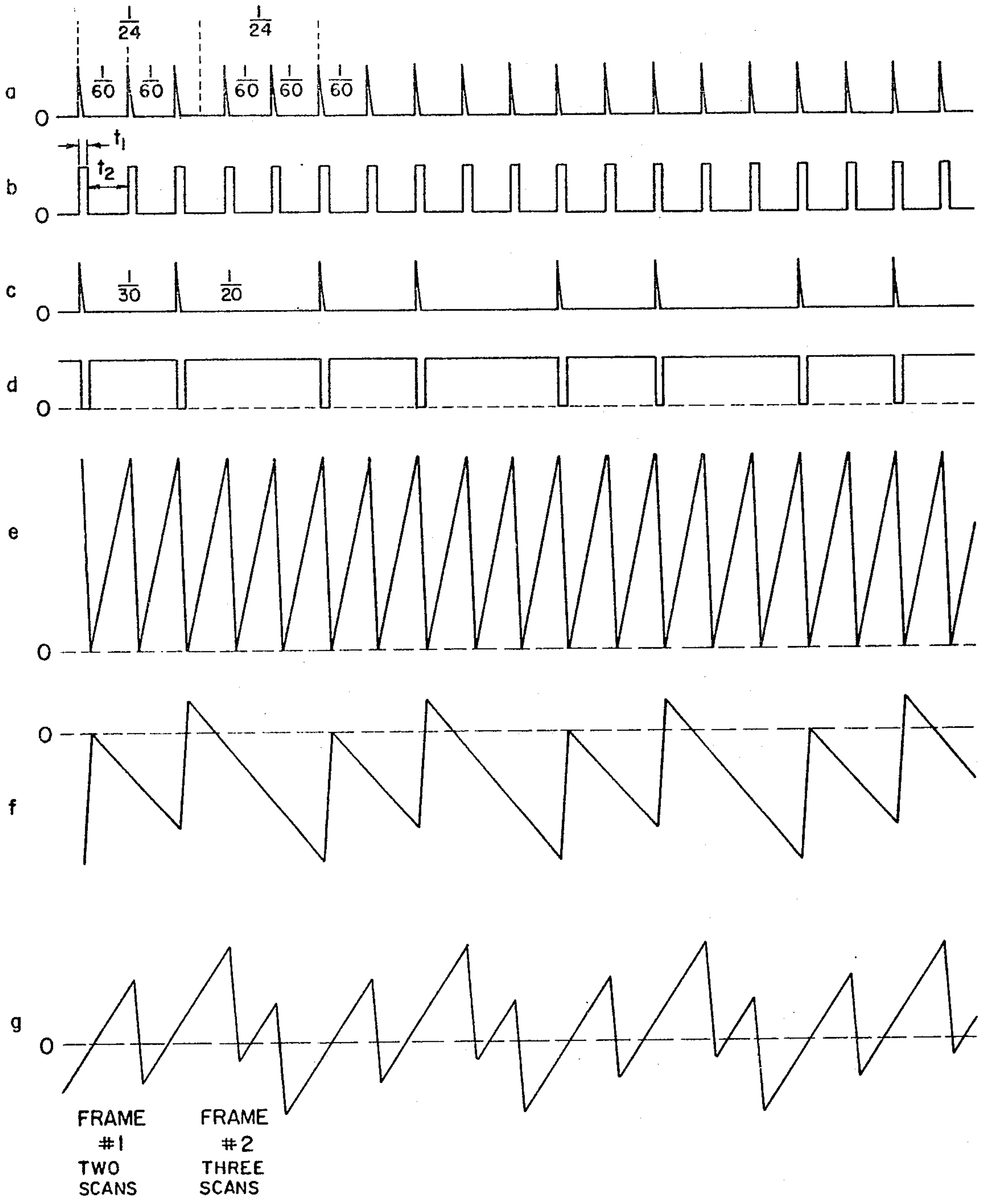
FIG. 2 is a view showing wave forms for scanning a continuously moving film in accordance with the embodiment of FIG. 1.
Figure 7:
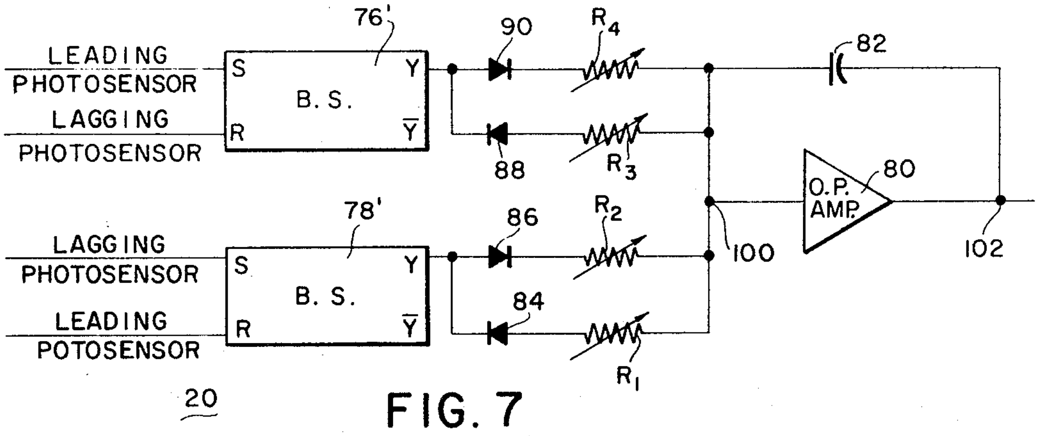
FIG. 7 is a schematic representation of an alternative vertical deflection circuit that may be used in FIG. 1.

Referring now to FIG. 7 there is shown an alternative embodiment of the vertical deflection circuit 20 of FIG. 1. In FIG. 2, monostable multivibrators are responsive to the positive transitions of the detected pulse signals to produce further pulse signals having a duration $t1$ equal to the vertical retract time of the flying spot scanning device. The circuit of FIG. 7, however, employs bistable multivibrators 76' and 78' having set S and reset R input terminals. The positive transitions of a signal applied to either input terminal will determine the bistable state of the multivibrators 76' and 78'. The use of bistable multivibrators therefor necessitates the employment of a pair of photosensors in place of each single photosensor of FIGS. 1, 3 and 5. The photosensors of a pair furthermore must be spaced apart by a dimension, with respect to the frame rate of movement of the film, that will provide a time period between the respective pair of impulses generated thereby equal to the vertical retrace time $t1$ of the flying spot scanning device.

Figure 8:
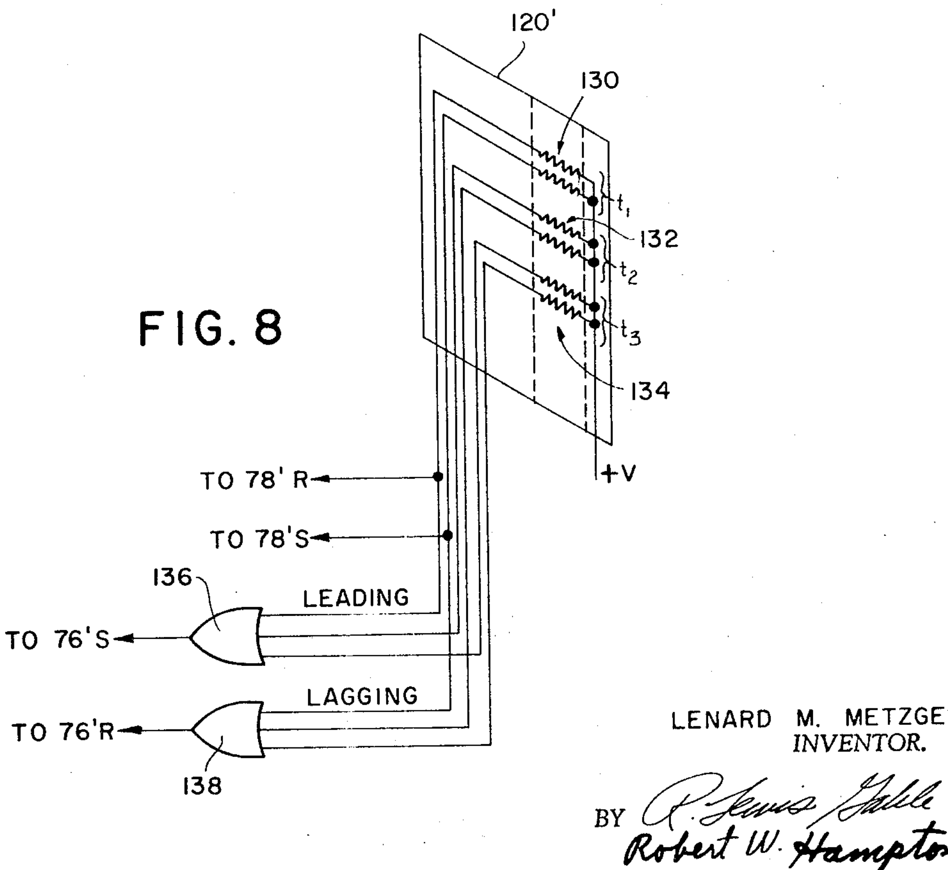
FIG. 8 is a schematic illustration in partial perspective of an alternative array of photosensors for use in FIG. 5 in conjunction with FIG. 7.

Referring to FIG. 8, there is shown an array of photosensor pairs 130, 132, and 134 arranged on a substrate 120' in the manner described with reference to the embodiment of FIG. 5. The photosensor pair 130, for example, replaces photosensor 118*a* of FIG. 5 and consists of a leading (in the direction of film movement depicted in FIG. 5) and a lagging photosensor. The leading and lagging photosensors of each pair are spaced apart by a distance that, when traversed by a sprocket hole or indicia 122 of the film 28 at 20 frames per second, results in the production of a pair of impulses spaced apart in time by the retrace time period $t1$. The leading impulses generated by the leading photosensors of each pair are added by OR gate 136 to the set S input terminal of bistable multivibrator 76'. The lagging impulses generated by the lagging photosensors of each pair are added by OR gate 138 to the reset R input terminal of the bistable multivibrator 76'. The leading and lagging impulses generated by the lagging and leading photosensors of the photosensor pair 130 are applied to the reset R and set S input terminals of bistable multivibrator 78'. The resulting wave forms and operation of the circuit of FIG. 7 is identical to those described with respect to FIGS. 5 and 6.

With respect to FIG. 1, the photosensors 70 and 72 would have to be replace by pairs 70' and 72' of photosensors each pair being physically arranged in parallel along its associated track on the disc 64. The output signals of the leading (in the direction of rotation of the disc) photosensor of each pair would be applied to the set S inputs of multivibrator 76' and 78'. The output signals of the lagging photosensor of each pair would be applied to the reset R inputs of the respective multivibrators 76' and 78'.

From the description of the preferred embodiment set forth above, it is apparent that the invention can be practiced in many alternative ways. It is apparent that the invention may be practiced in substantially the same manner as disclosed in the preferred embodiments at the European 50 per second, television field rate or any other standard field rate.

Also, it is apparent that the rate of movement of the motion picture film or other image bearing media may be detected from indicia, instead of the sprocket holes, recorded on the media.

Furthermore, it is apparent that the indicia on the rotating disk may be opaque or transparent to light and may consist of slits in an opaque disk.

As may be seen, a novel system has been disclosed for transforming the images and sound track of an ordinary, inexpensive motion picture film into respective video and audio signals for television transmission or direct connection to the antenna terminals of the conventional television receiver. The system if compatible with professional and amateur motion picture films, both black and white and color, and with and without sound tracks.

In summary, it will be readily apparent that by virtue of the novel arrangements disclosed whereby the vertical deflection circuit is directly controlled by the detected film frame rate and raster deflection rate, the deflection of the scanning beam is readily effected in exacy synchronism with the film movement. The vertical deflection disclosed is adaptable to a wide range of film frame rates and compensates for minor fluctuations in the spacing between film frames or the frame rate itself since the television field rate is detected from the actual rate of movement of the film.

The invention has been described in detail with particular reference to preferred embodiments thereof, but it will be understood that variations and modifications can be effected within the spirit and scope of the invention.

I claim:

1. In apparatus for deriving an image signal from an information bearing medium having a plurality of successive image frames disposed thereon, the combination comprising:

a. means for defining a scanning station;

b. means for moving the information bearing medium at a nominal image frame rate relative to said scanning station;

c. means for scanning repetitively at a first rate the image frames moving relative to said scanning station in a raster pattern comprising a plurality of spaced line scans and for providing an image signal of the scanned image frames;

d. first means for detecting the first rate from the movement of the information bearing medium relative to said scanning station and for producing a first signal indicative of the first rate;

e. second means for detecting the raster deflection rate of said scanning means from the movement of the information bearing medium relative to said scanning station and for producing a second signal indicative of the raster deflection rate;

f. third means responsive to said first and second signals for producing a third signal indicative of the raster deflection rate of said second signal and the first rate of said first signal; and g. means responsive to said third signal for positioning the scanning raster pattern in synchronism with the moving image frames in accordance with said raster deflection rate and repeating the scanning raster pattern at said first rate.

2. The apparatus of claim 1 wherein said information bearing medium consists of motion picture film.

3. The apparatus of claim 1 wherein said information bearing medium consists of motion picture film having sprocket holes associated with each image bearing frame thereon and wherein said first and second detecting means comprise:
a. means for directing radiation in a path intercepted by said sprocket holes; and
b. photoresponsive means positioned with respect to said sprocket holes to detect the radiation modulated by said sprocket holes.

4. The apparatus of claim 3 wherein said photoresponsive means comprises a plurality of photosensors equally spaced one from the other in a dimension equal to the dimension between adjacent sprocket holes of the motion picture film.

5. The apparatus of claim 4 wherein the number of said photosensors is the integral quotient of said first rate divided by the motion picture film frame rate of movement, and the raster deflection rate is equal to said rate of movement.

6. The apparatus of claim 1 wherein said information bearing medium consists of a motion picture film, said moving means comprises a rotating sprocket wheel adapted to engage the sprocket holes on the motion picture film, and said first and second detecting means comprise:
a. a disc adapted to rotate with said sprocket wheel and having repetitive indicia disposed in concentric tracks on said disc;
b. means for directing radiation in a path intercepted by said indicia on said disc; and
c. photoresponsive means positioned with respect to said concentric tracks of said indicia to detect the radiation modulated by said indicia.

7. The apparatus of claim 6 wherein said sprocket wheel includes a number of projections adapted to engage the sprocket holes of the motion picture film, the frame rate of movement is equal to the number $M$, said first rate is required a constant number $K$, and said indicia are disposed in first and second concentric tracks on the surface of said disc, the indicia in said first track being equally spaced apart and of a number $N$ equal to the produce of $P \times K/M$, and the number of indicia disposed in said second track are equal to the number $P$ and are disposed in phase with selected indicia of said first track.

8. The apparatus of claim 6 wherein said disc is opaque to said radiation and said indicia comprise slits in said disc through which said radiation is transmitted, and said photoresponsive means are disposed to intercept said radiation transmitted through said slits.

9. In apparatus for deriving an image signal from a motion picture film having a plurality of successive image frames disposed thereon, the combination comprising:
a. means for defining a scanning station;
b. means for moving the motion picture film at a nominal image frame rate relative to said scanning station;
c. means for scanning repetitively at a television field rate frequency the image frames moving relative to said scanning station in a television raster pattern comprising a plurality of spaced line scans and for providing an image signal of the scanned image frames;
d. first means for detecting said television field rate from the movement of the motion picture film relative to said scanning station and for producing a first signal indicative of said television field rate;
e. second means for detecting the waste deflection rate of said scanning means from the movement of said motion picture film relative to said scanning station and for producing a second signal indicative of said raster deflection rate;
f. third means responsive to the first and second signals for producing a third signal having a complex sawtooth wave form and a frequency equal to said television field rate; and
g. fourth means responsive to the third signal for generating said raster pattern at said television field rate and positioning said raster pattern in synchronism with the movement of each image frame relative to said scanning station.

10. The apparatus of claim 9 wherein said third means comprises:
a. an integrating circuit having a summing input terminal and an output terminal;
b. a first pair of unidirectionally conducting elements connected between said summing input terminal and said first means for applying said first signal to said summing input terminal; and
c. a second pair of unidirectionally conductive, elements connected between said summing input terminal and said second means for applying said second signal to said summing input terminal.

11. The apparatus of claim 9 wherein said motion picture film has a sprocket hole associated with each image bearing frame thereon and wherein said first and second detecting means comprise:
a. means for directing radiation in a path intercepted by said sprocket holes; and
b. photoresponsive means positioned with respect to said sprocket holes to detect the radiation modulated by said sprocket holes.

12. The apparatus of claim 11 wherein said photoresponsive means comprises a plurality of photosensors equally spaced one from the other in a dimension equal to the dimension between adjacent sprocket holes of said motion picture film.

13. The apparatus of claim 12 wherein the number of said photosensors is the integral quotient of the television field rate divided by the motion picture film frame rate of movement, and the raster deflection rate is equal to said rate of movement.

14. The apparatus of claim 9 wherein said motion picture film has a sprocket hole associated with each image bearing frame, said moving means comprises a rotating sprocket wheel adapted to engage the sprocket holes in the motion picture film, and said first and second detecting means comprise:
a. a disc adapted to rotate with said sprocket wheel and bearing repetitive indicia disposed in concentric tracks on said disc;
b. means for directing radiation in a path intercepted by the indicia on said disc; and
c. photoresponsive means positioned with respect to said concentric tracks of indicia to detect the radiation modulated by said indicia.

15. The apparatus of claim 14 wherein said sprocket wheel includes a number $P$ of projections adapted to engage the sprocket holes of the motion picture film, said frame rate of movement is equal to the number $M$, said given rate is a constant number $K$, and said indicia are disposed in first and second concentric tracks on the surface of said disc, the indicia in said first track being equally spaced apart and of a number $N$ equal to the produce of $P \times K/M$, and the number of indicia disposed in said second track are equal to the number $P$ and are disposed in phase with selected indicia of said first track.

16. The apparatus of claim 14 wherein said disc is opaque to said radiation and said indicia comprise slits in said disc through which said radiation is transmitted, and said photoresponsive means are disposed to intercept said radiation transmitted by said slits.

17. In apparatus for selectively deriving an image signal from the image frames of a moving or stationary image bearing medium the combination comprising:
a. means for defining a scanning station;
b. means operative in a first mode for moving the image bearing medium at a nominal image frame rate relative to said scanning station and operative in a second mode for locating a single image frame in a stationary relationship with respect to said scanning station;
c. means for scanning repetitively in a raster pattern at a field rate frequency and for providing an image signal of the image frames moving relative to said scanning station in said first mode of operation and the single image frame disposed in a stationary relationship with respect to said scanning station in said second mode of operation, the raster pattern comprising a plurality of spaced line scans;

d. first means responsive to the operation of said moving means in said first and second mode for detecting said field rate and for producing a first signal indicative of said field rate;

e. second means responsive to the operation of said moving means in said first mode for detecting the raster deflection rate of said scanning means and for producing a second signal indicative of said raster deflection rate;

f. said first means and said second means comprising 1. a disc adapted to rotate with the operation of said moving means in said first and second mode and bearing repetitive indicia disposed in concentric first and second tracks on said disc,
2. means for directing radiation in a path intercepted by the indicia on said disc, and
3. photoresponsive means positioned with respect to said first and second concentric tracks of indicia to detect the radiation modulated by said indicia and produce said first and second signals, respectively;

g. means responsive to said first and second signals for producing a third signal having a complex sawtooth wave form and a frequency $N$ equal to said field rate when said moving means is operative in said first mode;

h. means responsive to said third signal for generating said raster pattern at said field rate and for positioning said raster pattern in synchronism with the movement of each image frame relative to said scanning station when said moving means is operative in said first mode; and i. means responsive to said first signal for generating said raster pattern at said field rate and positioning said raster pattern upon said stationary image frame when said moving means is operative in said second mode.

18. In apparatus for selectively deriving an image signal from the image frames of a moving or stationary image bearing medium the combination comprising:

a. means for defining a scanning station;

b. means operative in a first mode for moving the image frames of said image bearing medium at a nominal rate relative to said scanning station and operative in a second mode for locating a single image frame in stationary relationship with respect to said scanning station;

c. a disc coupled with said moving means to rotate at a rate related to the rate of movement of the motion picture film, said disc bearing repetitive indicia disposed in first and second concentric tracks on said disc;

d. first means responsive to the operation of said moving means in said first and second mode for detecting said field rate and for producing a first signal indicative of said field rate;

e. first means responsive to the operation of said moving means in said first mode and said second mode for detecting said field rate from said first track of indicia on said disc and for producing a first signal indicative of said field rate;

f. second means responsive to the operation of said moving means in said first mode for detecting the raster deflection rate of said scanning means from said second track of indicia on said rotating disc and for producing a second signal indicative of said raster deflection rate;

g. means responsive to said first signal for generating said raster pattern at the television field rate and, in said second mode of operation of said moving means, for positioning said raster pattern upon said single stationary image frame disposed with respect to said scanning station;

h. means responsive to said first and second signal, when said moving means is operative in said first mode, for producing a third signal having a complex sawtooth wave form and a frequency equal to said television field rate; and i. means responsive to said third signal for generating said raster pattern at said television field rate and positioning said raster pattern in synchronism with the movement of each image frame moving relative to said scanning station in said first mode of operation.

* * * * *